(12) United States Patent
Guntaka et al.

(10) Patent No.: US 10,401,614 B1
(45) Date of Patent: Sep. 3, 2019

(54) SYSTEM AND METHOD FOR ELECTROWETTING DISPLAY DEVICE WITH COLOR FILTERS HAVING VARIABLE OPTICAL DENSITY

(71) Applicant: Amazon Technologies, Inc., Seattle, WA (US)

(72) Inventors: Sridhar Guntaka, Eindhoven (NL); Toru Sakai, Waalre (NL); Karel Johannes Gerhardus Hinnen, Eindhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 202 days.

(21) Appl. No.: 15/197,119

(22) Filed: Jun. 29, 2016

(51) Int. Cl.
*G02B 26/00* (2006.01)
*G02B 5/20* (2006.01)

(52) U.S. Cl.
CPC .......... *G02B 26/005* (2013.01); *G02B 5/201* (2013.01); *G02B 2207/115* (2013.01)

(58) Field of Classification Search
CPC .... G02B 26/005; G02B 26/004; G02B 5/201; G02B 5/3058; G02B 26/02; G02B 26/007; G02B 3/14; G02B 26/04; G02B 5/003; G02B 5/0236; G02B 5/0273; G02B 5/0278

USPC .............. 359/237, 242, 265-267, 270-273, 359/290-292, 295, 298, 315, 321, 322
See application file for complete search history.

(56) References Cited

U.S. PATENT DOCUMENTS

| 2005/0117108 | A1* | 6/2005 | Kume | G02F 1/133707 349/156 |
| 2015/0370141 | A1* | 12/2015 | Guo | G02F 1/167 359/296 |
| 2017/0276928 | A1* | 9/2017 | Sakai | G02B 5/201 |

* cited by examiner

*Primary Examiner* — Brandi N Thomas
(74) *Attorney, Agent, or Firm* — Quarles & Brady LLP

(57) ABSTRACT

A system and method for an electrowetting display device are presented. The electrowetting display device includes a first support plate and a second support plate, A plurality of pixel walls associated with an electrowetting pixel are formed over the first support plate. A color filter is over the electrowetting pixel. The color filter allows propagation of visible light of a first color and prevents propagation of visible light of a second color. In an embodiment, the color filter includes a layer of light-absorbing photoresist that is patterned into a first plurality of regions and a second plurality of regions. Each region in the first plurality of regions has a first optical density and each region in the second plurality of regions has a second optical density so that the color filter has a non-uniform optical density.

19 Claims, 11 Drawing Sheets

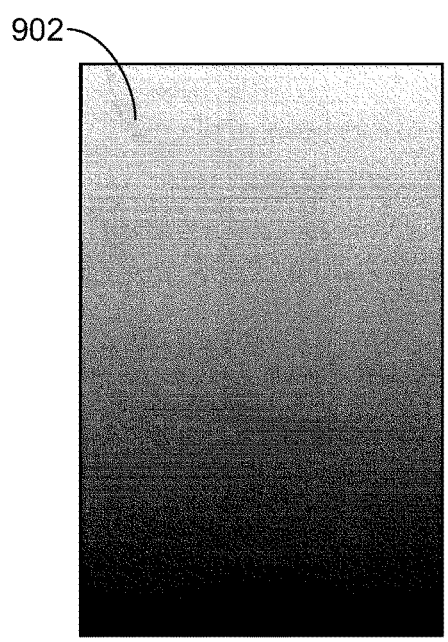 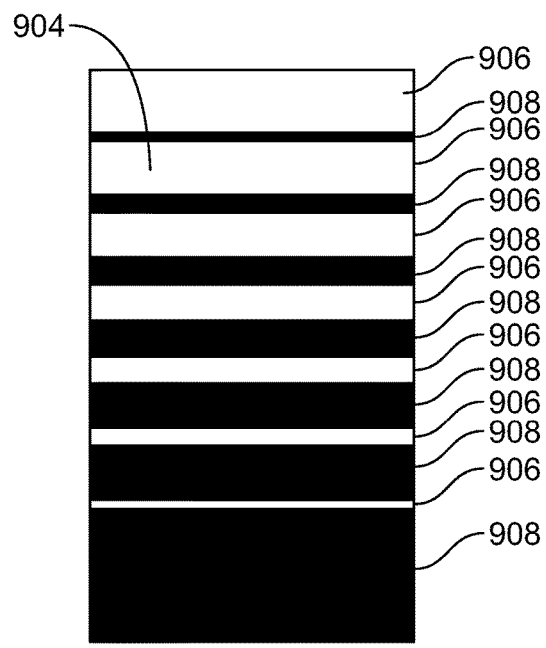
FIG. 9A  FIG. 9B

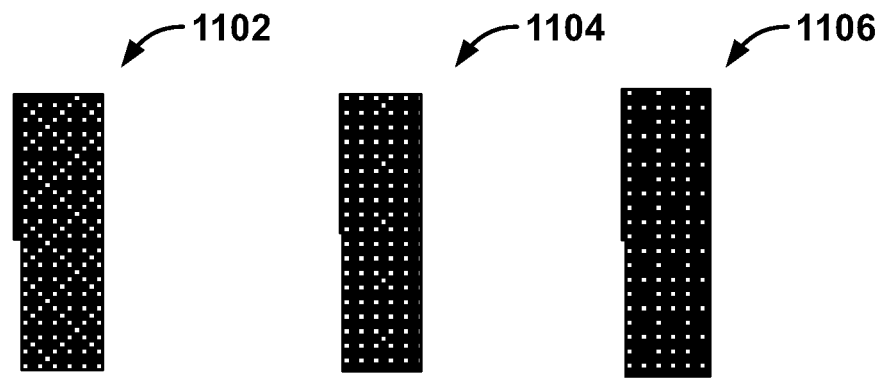
FIG. 11A  FIG. 11B  FIG. 11C
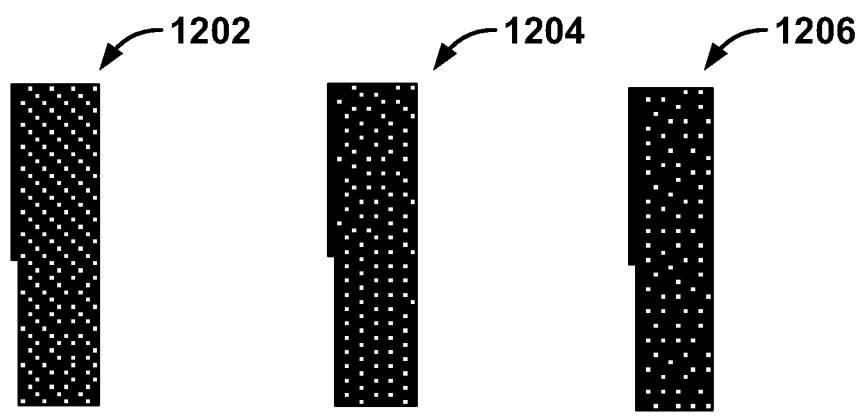
FIG. 12A  FIG. 12B  FIG. 12C

SYSTEM AND METHOD FOR ELECTROWETTING DISPLAY DEVICE WITH COLOR FILTERS HAVING VARIABLE OPTICAL DENSITY

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, enhancing user experience and satisfaction continues to be a priority. Moreover, increased multimedia use imposes high demands on designing, packaging, and fabricating display devices, as content available for mobile use becomes more extensive and device portability continues to be a high priority to the consumer.

An electrowetting display includes an array of pixels individually bordered by pixel walls that retain fluid, such as an opaque oil, for example. Light transmission through each pixel is adjustable by electronically controlling a position of the fluid in the pixel.

BRIEF DESCRIPTION OF THE DRAWINGS

The detailed description is set forth with reference to the accompanying figures. The use of the same reference numbers in different figures indicates similar or identical items or features.

FIG. 9A depicts a top view of an example color filter in which the filter's optical density varies continuously along the length of color filter.

FIG. 9B depicts a top view of an example color filter in which the filter's optical density does not vary continuously along the length of color filter.

FIGS. 11A, 11B, and 11C depict approaches for pixelating the high optical density bands of a mask.

FIGS. 12A, 12B and 12C depict approaches for pixelating the high optical density bands of a mask using a Floyd-Steinberg dithering algorithm.

DETAILED DESCRIPTION

Figure 1A:
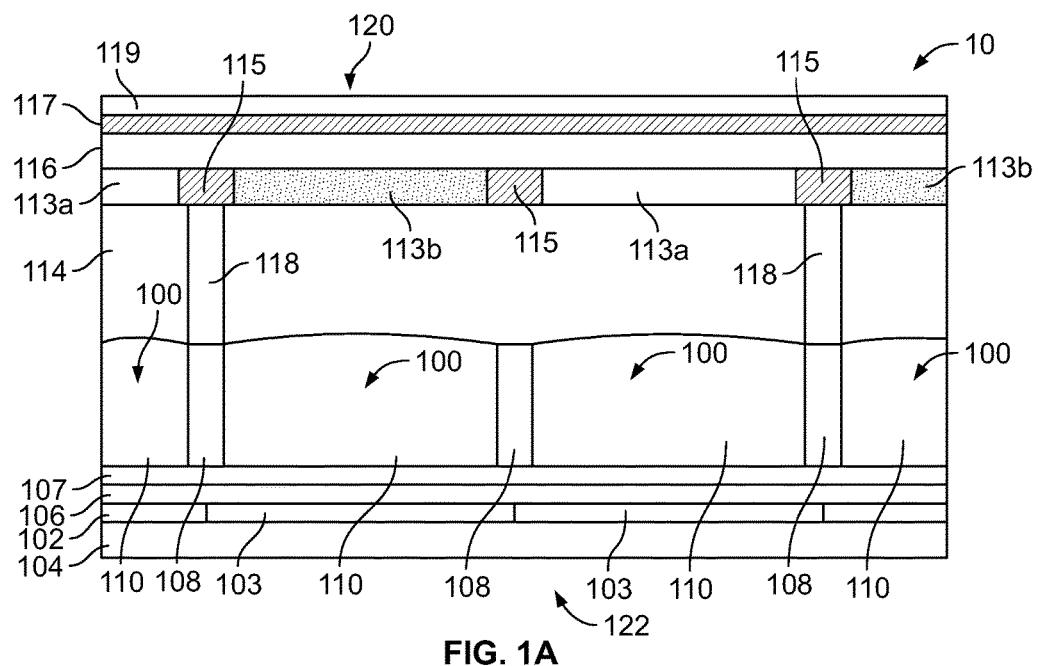
FIGS. 1A and 1B illustrate cross-sectional views of a portion of an electrowetting display device.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like.

An electrowetting display includes a number of electrowetting pixels. Within the display, each electrowetting pixel is associated with a number of pixel walls. The pixel walls form a structure that is configured to contain at least a portion of a first fluid, such as a black opaque oil. Light transmission through the electrowetting pixel can be controlled by an application of an electric potential or driving voltage to the electrowetting pixel, which results in a movement of a second fluid, such as an electrolyte solution, into or within the electrowetting pixel, thereby displacing the oil.

When the electrowetting pixel is in a rest state (i.e., with no driving voltage applied or at a driving voltage that falls below a threshold value causing the electrowetting pixel to be inactive), the oil is distributed throughout the pixel. The oil absorbs light and the pixel in this condition appears black. But when the driving voltage is applied, the oil is displaced to one or more sides of the pixel. Light can then enter the electrowetting pixel striking a reflective surface at the bottom of the pixel. The light then reflects out of the pixel, causing the pixel to appear less dark (e.g., white) to an observer. If the reflective surface only reflects a portion of the spectrum of visible light or if color filters are incorporated above the pixel, the pixel may appear to have color.

The degree to which the oil is displaced from the oil's resting position affects the overall reflectance of the pixel—the pixel's capability to reflect or transmit light—and, thereby, the pixel's appearance. In an optimal display device, changes in the driving voltage for a particular pixel results in predictable changes in the pixel's reflectance value, enabling the overall reflectance of the display device to be precisely and predictably controlled. For example, in some display devices, an optimal relationship between driving voltage and pixel reflectance would be linear. In still other display devices, an optimal relationship between driving voltage and reflectance may follow the same curve as the gamma curve for the display device.

The human eye does not perceive changes in brightness in a linear manner—the eye is more sensitive to changes in brightness at darker brightness levels than at lighter brightness levels. Because of this, most display devices change their pixel brightness according to the device's gamma curve, which dictates brightness levels based upon a particular input value. A typical gamma curve for a particular display device may call for smaller changes in brightness or reflectance at lower input values and a greater change in brightness at higher input values, which mimics the sensitivity of the human eye. As such, the optimal relationship between driving voltage and reflectance may mimic the curve of the display device's gamma curve.

In implementations, however, the actual reflectance of a pixel does not vary linearly with driving voltage. Instead, when the pixel is first opening and the oil is first moving from the oil's at-rest position (i.e., at lower driving voltages) a small change in driving voltage can result in a relatively large oil movement and change in pixel reflectance. Conversely, when the pixel is nearly fully open (i.e., at higher driving voltages approaching the maximum driving voltage), that same small change in driving voltage can result in a much smaller oil movement and change in pixel reflectance. This non-linear relationship between pixel reflectance and driving voltage can reduce the grayscale resolution of conventional display devices.

In the present system, an electrowetting display device is provided in which a color filter is provided over each pixel of the display device. In contrast to conventional display devices, the optical density of each of the color filters—the degree to which each color filter blocks or impedes light passing through the filter—is non-uniform across the surface of each color filter. In other words, in each individual color filter different regions of the color filter can allow different amounts of light through the filter. Within the display device, each color filter is configured so that the color filters have a higher optical density (i.e., block more light) over the region of the pixel's reflective surface that is exposed when the oil first begins moving from the oil's resting position. Conversely, the color filters have a lower optical density (i.e., block less light) over the region of the pixel's reflective surface that is exposed when the oil reaches the oil's fully open position. Because the optical density of each color filter affects the perceived reflectance of each pixel, the varying optical density of each color filter can be configured to offset the non-linear changes in pixel reflectance that result from changes in drive voltage. Accordingly, the present color filters are configured so that the optical density of the color filters varies in a non-linear manner that offsets or at least partially negates the non-linearity in changes of reflectance resulting from oil movement within the pixel.

A display device, such as an electrowetting display device, may be a transmissive, reflective or transflective display that generally includes an array of pixels configured to be operated by an active matrix addressing scheme. In this disclosure, a pixel may, unless otherwise specified, comprise a single sub-pixel or a pixel that includes two or more sub-pixels of an electrowetting display device. Such a pixel or sub-pixel may be the smallest light transmissive, reflective or transflective element of a display that is individually operable to directly control an amount of light transmission through and/or reflection from the element. For example, in some implementations, a pixel may be a red sub-pixel, a green sub-pixel, a blue sub-pixel or a white sub-pixel of a larger pixel or may, in some cases, include a number of sub-pixels. As such, a pixel may be a pixel that is a smallest component, e.g., the pixel does not include any sub-pixels.

Rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) associated with each pixel. The transistors take up a relatively small fraction of the area of each pixel to allow light to efficiently pass through (or reflect from) the display pixel.

Electrowetting displays include an array of pixels sandwiched between two support plates, such as a bottom support plate and a top support plate. For example, a bottom support plate in cooperation with a top support plate may contain pixels that include electrowetting oil, electrolyte solution and pixel walls between the support plates. Support plates may include glass, plastic (e.g., a transparent thermoplastic such as a poly(methyl methacrylate) (PMMA) or other acrylic), or other transparent material and may be made of a rigid material or a flexible material, for example. Pixels include various layers of materials built upon a bottom support plate. One example layer is a hydrophobic layer, e.g. a fluoropolymer layer, around portions of which pixel walls are built.

Hereinafter, example embodiments include, but are not limited to, reflective electrowetting displays that include a clear, transparent, or semi-transparent top support plate and a bottom support plate, which need not be transparent. The clear top support plate may comprise glass or any of a number of transparent materials, such as transparent plastic, quartz, and semiconductors, for example, and claimed subject matter is not limited in this respect. "Top" and "bottom" as used herein to identify the support plates of an electrowetting display do not necessarily refer to a direction referenced to gravity or to a viewing side of the electrowetting display. Also, as used herein for the sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing a pixel or material as being transparent generally means that the pixel or material may transmit or enable the propagation of a relatively large fraction of the light incident upon it. For example, a transparent material or layer may transmit or propagate more than 70% or 80% of the light impinging on its surface, though claimed subject matter is not limited in this respect. In contrast, opaque generally means that the pixel or material may block or inhibit the transmission or propagation of at least a portion of the visible light spectrum incident upon it. For example, a black opaque material or layer may block, absorb, or otherwise prevent the propagation of more than 70% or 80% of the light impinging on its surface, though claimed subject matter is not limited in this respect. In the present disclosure, materials that are described as preventing the propagation of light shall be understood to prevent propagation of at least 70% of the light striking the material. Alternatively, opaque material may be transmissive for a portion of the visible light spectrum and blocking other portions, forming a color filter. Similarly, materials that are described as being transparent or allowing propagation of light shall be understood to transmit or propagate at least 70% of the light striking the material. In this description, the visible light spectrum may include light having a wavelength between 390 nanometers (nm) and 700 nm.

Pixel walls retain at least a first fluid that is electrically non-conductive in the individual pixels. For example, the first fluid may include an opaque or colored oil. References in the present disclosure to an oil shall be understood to refer to any fluid that is electrically non-conductive. Each pixel includes a cavity formed between the support plates that is at least partially filled with the oil (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing in some embodiments. The second fluid is immiscible with the first fluid. Herein, substances are immiscible with one another if the substances do not substantially form a solution.

Individual reflective electrowetting pixels may include a reflective layer on the bottom support plate of the electrowetting pixel, a transparent electrode layer adjacent to the reflective layer, and a hydrophobic layer on the electrode layer. Alternatively, the reflective layer may act as the pixel electrode. Pixel walls, associated with and formed around each pixel, the hydrophobic layer, and the transparent top support plate at least partially enclose a fluid region that includes an electrolyte solution and the oil, which is immiscible with the electrolyte solution. An "opaque" fluid, as described herein, is used to describe a fluid that appears black or to have color to an observer. For example, an opaque fluid appears black to an observer when it strongly absorbs a broad spectrum of wavelengths (e.g., including those of red, green and blue light) in the visible region of light or electromagnetic radiation. In some embodiments, the opaque fluid is a non-polar electrowetting oil.

The opaque fluid is disposed in the fluid region. A coverage area of the opaque fluid on the bottom hydrophobic layer is electrically adjustable to affect the amount of light incident on the reflective electrowetting display that reaches the reflective material at the bottom of each pixel.

In addition to pixels, spacers and edge seals may also be located between the two support plates. Spacers and edge seals that mechanically connect the first support plate with and opposite to the second overlying support plate, or which form a separation between the first support plate and the second support plate, can contribute to the mechanical integrity of the electrowetting display. Edge seals, for example, being disposed along a periphery of an array of electrowetting pixels, may contribute to retaining fluids (e.g., the first and second fluids) between the first support plate and the second overlying support plate. Spacers can be at least partially transparent so as to not hinder throughput of light in the electrowetting display. The transparency of spacers may at least partially depend on the refractive index of the spacer material, which can be similar to or the same as the refractive indices of surrounding media. Spacers may also be chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image and/or video data. The code may cause the processor to modulate the optical properties of pixels by controlling electrical signals (e.g., voltages, currents, and fields) on, over, and/or in layers of the electrowetting display.

Figure 1B:
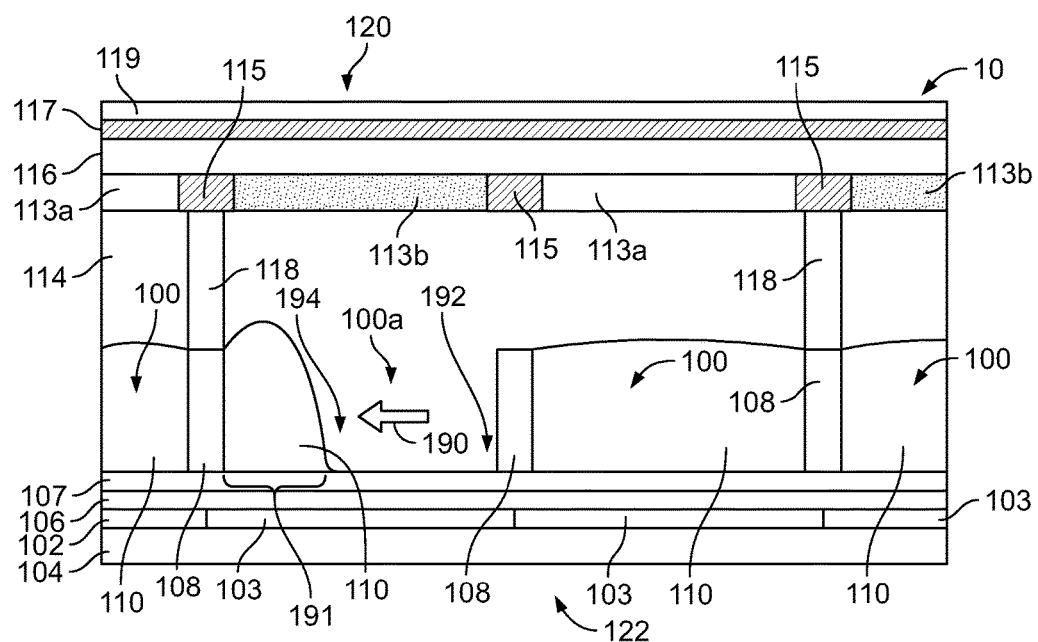
Figure 2:
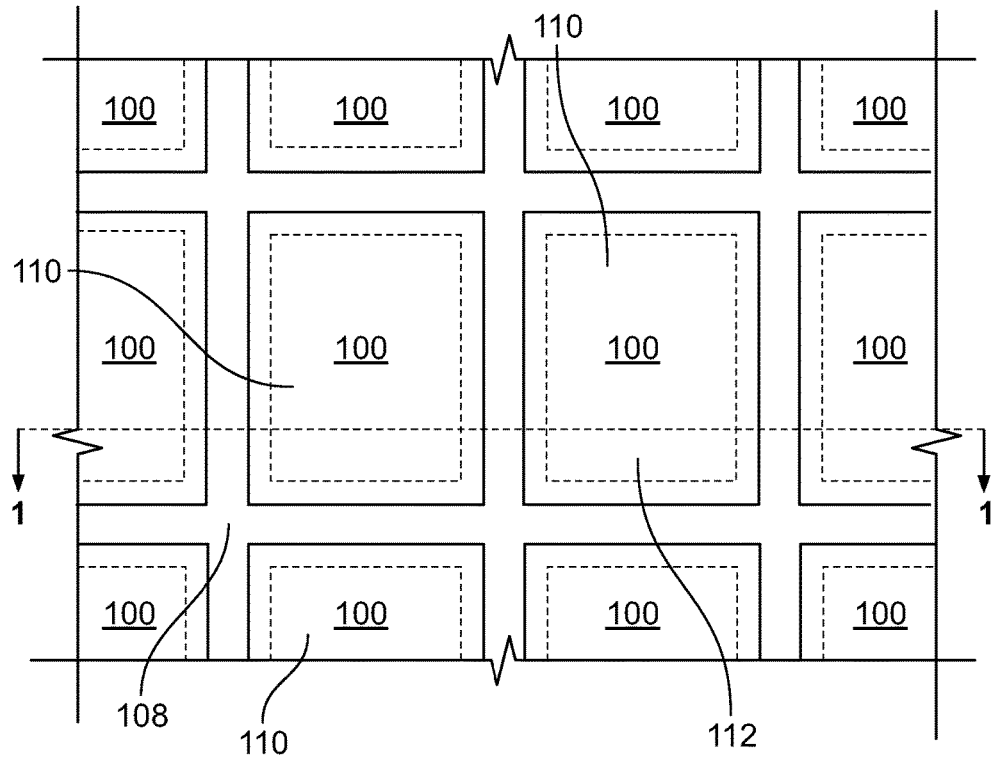
FIG. 2 illustrates a top view of the electrowetting pixels of FIGS. 1A and 1B mostly exposed by an electrowetting fluid, according to various embodiments.

FIG. 1A is a cross-section of a portion of an example conventional reflective electrowetting display device 10 illustrating several electrowetting pixels 100 taken along sectional line 1-1 of FIG. 2. FIG. 1B shows the same cross-sectional view as FIG. 1A in which an electric potential has been applied to one of the electrowetting pixels 100 causing displacement of an oil disposed therein, as described below. FIG. 2 shows a top view of electrowetting pixels 100 formed over a bottom support plate 104. The view shown in FIG. 2 is simplified and does not depict each component illustrated in FIGS. 1A and 1B and primarily illustrates the row and column layout of pixels 100.

In FIGS. 1A and 1B, two complete electrowetting pixels 100 and two partial electrowetting pixels 100 are illustrated. Electrowetting display device 10 may include any number (usually a very large number, such as thousands or millions) of electrowetting pixels 100. An electrode layer 102 is formed on a bottom support plate 104.

In various embodiments, electrode layer 102 consists of individual pixel electrodes 103, each addressing an individual pixel. The individual pixel electrodes may be connected to a transistor, such as a thin film transistor (TFT) (not shown), that is switched or otherwise controlled to either select or deselect an electrowetting pixel 100 using an active matrix addressing scheme, for example. A TFT is a particular type of field-effect transistor that includes thin films of an active semiconductor layer as well as a dielectric layer and metallic contacts over a supporting (but non-conducting) substrate, which may be glass or any of a number of other suitable transparent or non-transparent materials, for example. The TFTs and corresponding data lines may be formed within electrode layer 102 or within other layers over or within support plate 104.

In some embodiments, a dielectric barrier layer 106 may at least partially separate electrode layer 102 from a hydrophobic layer 107, also formed on bottom support plate 104. Barrier layer 106 may be formed from various materials including organic/inorganic multilayer stacks or layers. In some embodiments, hydrophobic layer 107 is an amorphous fluoropolymer layer including any suitable fluoropolymer (s), such as AF1600®, produced by DuPont, based in Wilmington, Del. Hydrophobic layer 107 may also include suitable materials that affect wettability of an adjacent material, for example.

Pixel walls 108 form a patterned electrowetting pixel grid on hydrophobic layer 107. Pixel walls 108 may comprise a photoresist material such as, for example, epoxy-based negative photoresist SU-8. The patterned electrowetting pixel grid comprises rows and columns that form an array of electrowetting pixels. For example, an electrowetting pixel may have a width and a length in a range of about 50 to 500 micrometers.

Oil 110 (or another opaque fluid), which may have a thickness (e.g., a height) in a range of about 1 to 10 micrometers, for example, overlays hydrophobic layer 107. Oil 110 is partitioned by pixel walls 108 of the patterned electrowetting pixel grid. A second fluid 114, such as an electrolyte solution, overlays oil 110 and pixel walls 108 of the patterned electrowetting pixel grid. Oil 110 is immiscible with second fluid 114.

Color filters 113a, 113b (collectively, 113) are positioned over each of pixels 100. Each color filter 113 may be configured to be substantially transparent to particular ranges of wavelengths of light, while absorbing others. For example, color filter 113a may be transparent to red light having wavelengths ranging from 620 nm to 750 nm, while absorbing light having other wavelengths. Conversely, color filter 113b may be transparent to green light having wavelengths ranging from 495 nm to 570 nm, while absorbing light having other wavelengths. Various pixels 100 within device 10 may be associated with color filters 113 that are transparent to all wavelengths of visible light, namely visible white light. As used herein, visible light refers to wavelengths of electromagnetic radiation visible to the human eye. Generally, this includes electromagnetic radiation having wavelengths between about 400 nm to about 700 nm.

Color filters 113, therefore, may be utilized to assign each pixel 100 a color, so that when a particular pixel 100 is in an open or at least partially open state, light reflected by that pixel 100 will take on the color of the color filter 113 positioned over that pixel 100. In other embodiments of device 10, color filter 113 could instead be located over a bottom surface of each pixel (e.g., upon or incorporating into hydrophobic layer 107.

In an attempt to prevent cross-talk—light propagation between pixels 100—device 10 includes a number of black matrix members 115 positioned over each pixel wall 108 in device 10. Black matrix members 115 are configured to block or absorb all wavelengths of visible light and therefore reduce an amount of light that may enter device 10 over one pixel while exiting device 10 over a second pixel.

A support plate 116, in conjunction with color filters 113 and black matrix members 115, covers second fluid 114 and spacers 118 to maintain second fluid 114 over the electrowetting pixel array. A diffuser film (not shown) may be formed over or, in some cases, integrated into a portion of, support plate 116 to diffuse light striking a surface of support plate 116 and passing therethrough.

In one embodiment, spacers 118 extend to support plate 116 and may rest upon a top surface of one or more pixel walls 108. Multiple spacers 118 may be interspersed throughout the array of pixels 100. The dimensions and shape of the spacers is not restricted to pillar shape as shown in FIG. 1A, alternative shapes include crosses, lines of spacers, or full grid spacer structures.

In some embodiments of device 10, a front light component may be positioned over an edge of viewing side 120 of device 10. In these embodiments, a light guide 117 may be positioned over device 10 to guide light generated by the front light component over viewing side 120 of device 10. A layer 119, e.g. glass or other material, incorporating various touch-sensitive structures may also be positioned over device 10.

A driving voltage applied across, among other things, second fluid 114 and a pixel electrode in electrode layer 102 addressing a particular electrowetting pixel 100 may control transmittance or reflectance of individual electrowetting pixels 100.

Display device 10 has viewing side 120 on which an image formed by electrowetting display device 10 may be viewed, and an opposing rear side 122. Support plate 116 faces viewing side 120 and bottom support plate 104 faces rear side 122. Reflective electrowetting display device 10 may be a segmented display type in which the image is built of segments. The segments may be switched simultaneously or separately. Each segment includes one electrowetting pixel 100 or a number of electrowetting pixels 100 that may be adjacent or distant from one another. Electrowetting pixels 100 included in one segment are switched simultaneously, for example. Electrowetting display device 10 may also be an active matrix driven display type or a passive matrix driven display, for example.

As mentioned above, second fluid 114 is immiscible with oil 110. Second fluid 114 is electrically conductive and/or polar, and may be water or a salt solution such as a solution of potassium chloride in water, for example. In certain embodiments, second fluid 114 is transparent, but may be colored or light-absorbing. Oil 110 is electrically non-conductive and may for instance be an alkane like hexadecane or (silicone) oil.

Hydrophobic layer 107 is arranged on bottom support plate 104 to create an electrowetting surface area. The hydrophobic character of hydrophobic layer 107 causes oil 110 to adhere preferentially to hydrophobic layer 107 because oil 110 has a higher wettability with respect to the surface of hydrophobic layer 107 than second fluid 114 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

In some embodiments, oil 110 absorbs light within at least a portion of the optical spectrum and so may form a color filter. The fluid may be colored by addition of pigment particles or dye, for example. Alternatively, oil 110 may be black (e.g., absorbing substantially all light within the optical spectrum) or reflecting. Hydrophobic layer 107 may be transparent or reflective. A reflective layer may reflect light within the entire visible spectrum, making the layer appear bright, or reflect a portion of light within the visible spectrum, making the layer have a color.

If a voltage is applied across an electrowetting pixel 100, electrowetting pixel 100 will enter into an active or at least partially open state. Electrostatic forces will move second fluid 114 toward electrode layer 102 within the active pixel, thereby displacing oil 110 from that area of hydrophobic layer 107 to pixel walls 108 surrounding the area of hydrophobic layer 107, to a droplet-like form. Such displacing action at least partly uncovers oil 110 from the surface of hydrophobic layer 107 of electrowetting pixel 100. Due to the configuration of electrode layer 102, when the voltage is applied across the electrowetting pixel 100, oil 110 generally always move in the same direction within the pixel 100 so as to form into a droplet against the same wall 108 of the pixel 100.

FIG. 1B shows one of electrowetting pixels 100 in an active state (see pixel 100a). With an electric potential applied to a pixel electrode in electrode layer 102 underneath the activated electrowetting pixel 100a, second fluid 114 is attracted towards pixel electrode in electrode layer 102 displacing oil 110 within the activated electrowetting pixel 100.

As second fluid 114 moves towards hydrophobic layer 107 of the activated electrowetting pixel 100, oil 110 is displaced in a predictable direction within pixel 100a towards one of pixel walls 108 (e.g., in the direction of arrow 190), referred to herein as the oil displacement direction, and moves towards a pixel wall 108 of the activated pixel 100 or is otherwise displaced. The predictable direction 190 of oil 110 movement may result from the floor of pixel 100a (e.g., the top surface of hydrophobic layer 107 being at least partially raised at the far right of pixel 100a (as viewed in 1B). This may promote second fluid 114 entering pixel 100*a* at the right of pixel 100*a* and promoting movement of oil 110 in direction 190.

In the example of FIG. 1B, pixel 100*a* is fully open at a maximum driving voltage and oil 110 of pixel 100*a* has formed a droplet over an oil accumulation area 191 of pixel 100*a* as a result of the driving voltage being applied to pixel 100*a*. After activation of pixel 100*a*, when the voltage across electrowetting pixel 100*a* is returned to an inactive signal level of zero or a value near to zero, electrowetting pixel 100*a* will return to an inactive or closed state, where oil 110 flows back to cover hydrophobic layer 107. In this way, oil 110 forms an electrically controllable optical switch in each electrowetting pixel 100.

With oil 110 of pixel 100*a* displaced following the application of a driving voltage to pixel 100*a*, light can enter pixel 100*a* through color filter 113*b*, strike the exposed portion of the reflective surface at the bottom of pixel 100*a*, and reflect back out through color filter 113*b*.

Figure 3:
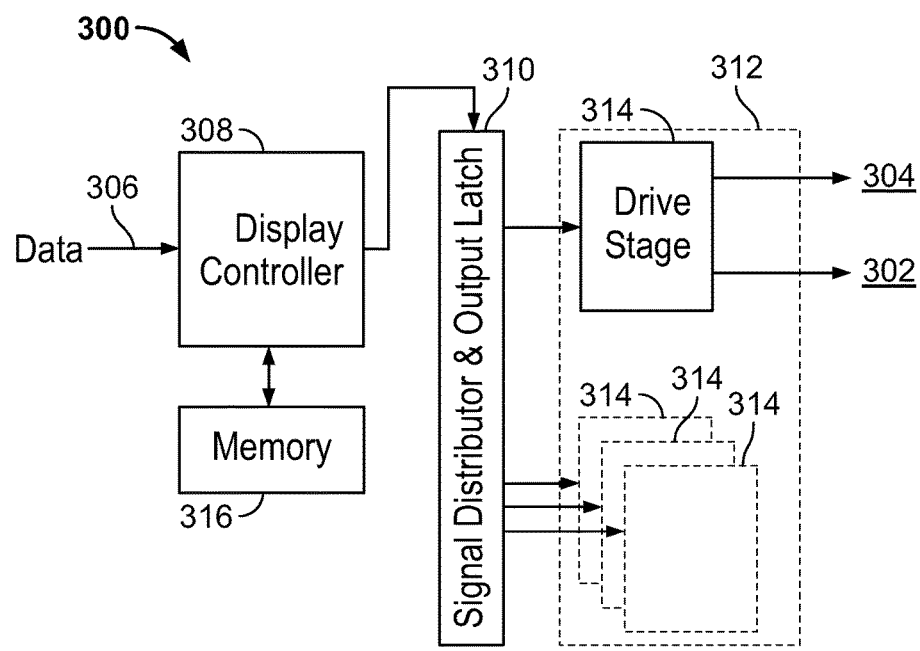
FIG. 3 is a block diagram of an example embodiment of an electrowetting display driving system, including a control system of the electrowetting display device.

FIG. 3 shows a block diagram of an example embodiment of an electrowetting display driving system 300, including a control system of the display device. Display driving system 300 can be of the so-called direct drive type and may be in the form of an integrated circuit adhered or otherwise connected to bottom support plate 104. Display driving system 300 includes control logic and switching logic, and is connected to the display by means of electrode signal lines 302 and a common signal line 304. Each electrode signal line 302 connects an output from display driving system 300 to a different electrode within each pixel 100, respectively. Common signal line 304 is connected to second fluid 114 through a common electrode, e.g. an electrode deposited over the color filter layer on the top support plate. Also included are one or more input data lines 306, whereby display driving system 300 can be instructed with data so as to determine which pixels 100 should be in an active or open state and which pixels 100 should be in an inactive or closed state at any moment of time. In this manner, display driving system 300 can determine a target reflectance value for each pixel 100 within the display.

Electrowetting display driving system 300 as shown in FIG. 3 includes a display controller 308, e.g., a microcontroller, receiving input data from input data lines 306 relating to the image to be displayed. Display controller 308, being in this embodiment the control system, is configured to apply a voltage to the first electrode to establish a particular display state (i.e., reflectance value) for a pixel 100. The microcontroller controls a timing and/or a signal level of at least one signal level for a pixel 100.

The output of display controller 308 is connected to the data input of a signal distributor and data output latch 310. Signal distributor and data output latch 310 distributes incoming data over a plurality of outputs connected to the display device, via drivers in certain embodiments. Signal distributor and data output latch 310 cause data input indicating that a certain pixel 100 is to be set in a specific display state to be sent to the output connected to pixel 100. Signal distributor and data output latch 310 may be a shift register. The input data is clocked into the shift register and at receipt of a latch pulse the content of the shift register is copied to signal distributor and data output latch 310. Signal distributor and data output latch 310 has one or more outputs, connected to a driver assembly 312. The outputs of signal distributor and data output latch 310 are connected to the inputs of one or more driver stages 314 within electrowetting display driving system 300. The outputs of each driver stage 314 are connected through electrode signal lines 302 and common signal line 304 to a corresponding pixel 100. In response to the input data, a driver stage 314 will output a voltage of the signal level set by display controller 308 to set one of pixels 100 to a corresponding display state having a target reflectance level.

To assist in setting a particular pixel to a target reflectance level, memory 316 may also store data that maps a particular driving voltage for a pixel to a corresponding reflectance value and vice versa. The data may be stored as one or more curves depicting the relationship between driving voltage and reflectance value, or a number of discrete data points that map a driving voltage to a reflectance value and vice versa. As such, when display controller 308 identifies a target reflectance value for a particular pixel, display controller 308 can use the data mapping driving voltage to reflectance value to identify a corresponding driving voltage. The pixel can then be driven with that driving voltage.

In some conventional display devices, the actual reflectance of a pixel does not vary linearly with driving voltages. Instead, when the pixel is first opening (i.e., at lower driving voltages and when the oil is first being displaced from the oil's at rest position distributed through the pixel) a small change in driving voltage can result in a relatively large in pixel reflectance. That is, a small change in driving voltage applied to a closed (or nearly closed) pixel may result in a relatively large movement of the pixel's oil. Conversely, when the pixel is nearly fully open (i.e., at higher driving voltages and with the oil almost fully contained within the oil accumulation region of the pixel), that same small change in driving voltage can result in a smaller movement of the oil and, consequently, a smaller change in pixel reflectance. As such, there is a non-linear relationship between drive voltage and movement of the pixel's oil. This can result in a non-linear relationship between drive voltage and pixel reflectance.

Figure 4:
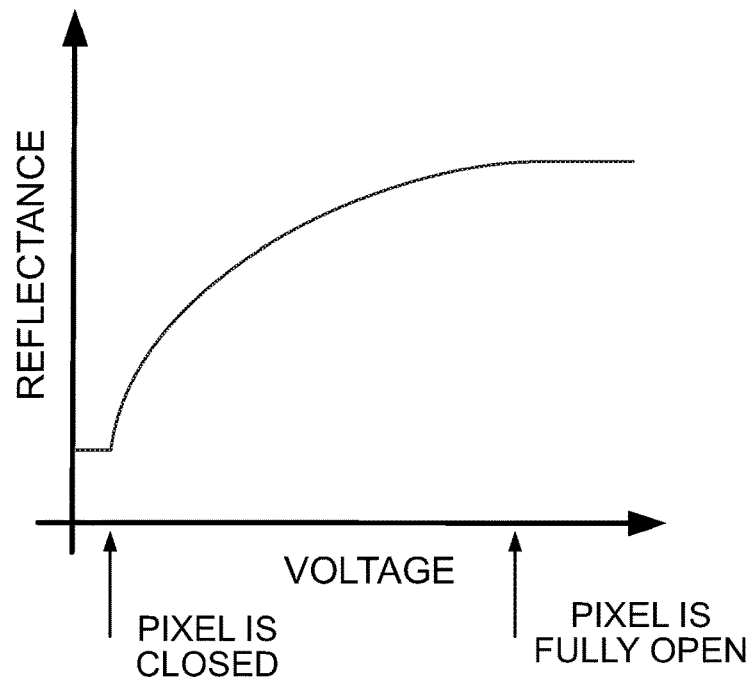
FIG. 4 is a graph depicting the relationship between pixel reflectance versus driving voltage.

To illustrate this phenomenon, FIG. 4 is a graph depicting the relationship between pixel reflectance versus driving voltage. The vertical axis represents pixel reflectance, while the horizontal axis represents driving voltage. In the present disclosure it is recognized that different pixel configurations may be controlled by the application of a positive or a negative voltage. Accordingly, driving voltage, as used herein, may refer to the magnitude of the driving voltage applied to the pixel where the pixel is increasingly opened at the driving voltage increases. As illustrated in FIG. 4, at the minimum driving voltage, the pixel is in a minimum reflectance state (i.e., the pixel is closed). As the driving voltage increases beyond a threshold the pixel begins to open (i.e., oil movement starts to expose an area of the pixel's reflective surface) causing the pixel's reflectance to increase. As illustrated, initially the pixel's reflectance increases rapidly for a given change in driving voltage. As the driving voltage increases, however, and the pixel approaches the pixel's maximum reflectance value, the rate at which reflectance increases is reduced. This non-linear relationship between the reflectance of the pixel and the driving voltage degrades the grayscale control of the pixel and the overall display device.

In the present system, to offset the non-linear relationship between pixel reflectance and driving voltage—resulting from the non-linear relationship between movement of a pixel's oil and the pixel's driving voltage—the color filters positioned over each pixel have a non-linear optical density. That is, different regions of each color filter allow different amounts of light through the color filter. So, for a red color filter, the filter will only transmit or propagate red light, but different regions of the color filter will transmit or propagate different amounts of red light.

Within the display device, each color filter is configured so that the color filters have a higher optical density (i.e., block more light) over the region of the pixel's reflective surface that is exposed when the oil first begins moving from the oil's resting position (e.g., location 192 on FIG. 6)—that is, when the driving voltage of the pixel is at or near a minimum value. Conversely, the color filters have a lower optical density (i.e., block less light) over the region of the pixel's reflective surface that is exposed when the oil reaches the oil's fully open position (e.g., location 194 on FIG. 6)—that is, when the driving voltage of the pixel is at or is approaching a maximum value. Because the optical density of each color filter affects the overall perceived brightness of each pixel by blocking some of the incident light from entering the pixel or preventing reflected light from exiting the pixel, the varying optical density of each color filter can be configured to offset the non-linear changes in pixel reflectance that result from changes in drive voltage.

Figure 5A:
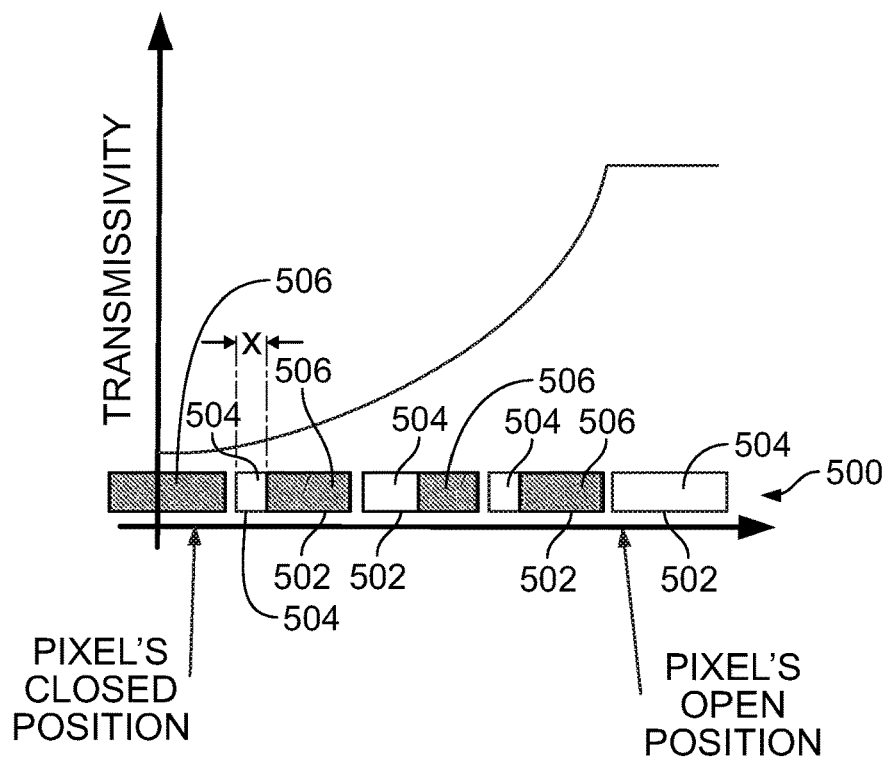
FIGS. 5A and 5B depict cross-section and top views, respectively of a color filter with varying optical density in accordance with the present disclosure.
Figure 5B:
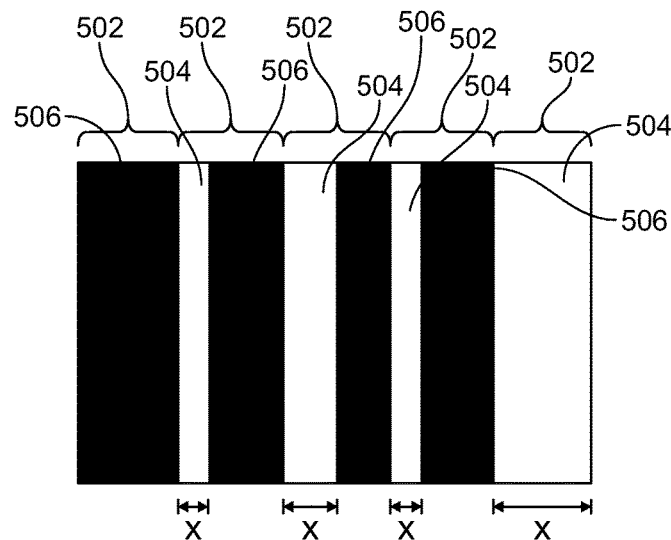

FIGS. 5A and 5B depict color filter 500 with non-uniform or varying optical density in accordance with the present disclosure. In FIG. 5A, a cross-sectional view of color filter 500 taken along line 5A-5A of FIG. 5B is shown next to a graph. FIG. 5B depicts a top view of color filter 500. The graph illustrates an approximation (i.e., a smoothed curve) of the transmissivity of color filter 500 based upon position along the top surface of color filter 500. Transmissivity refers to the ability of light to pass through color filter 500 and is approximately the inverse of the optical density of color filter 500.

The depiction of color filter 500 is a cross-section showing a side view of color filter 500, where the banded regions of high and low optical density are continuous across the width of color filter 500. The depiction of color filter 500 is simplified, in which the darker portions of color filter 500 block or inhibit the transmission or propagation of light and have high optical density, while the lighter or clear portions of color filter 500 allow light propagation and have low optical density. Although the depiction of color filter 500 only includes five darker portions or bands that extend across the width of color filter 500, it will be readily appreciated that in a real implementation of color filter 500, color filter 500 may include many more (possibly hundreds or thousands) of bands of high and low optical density materials having varying thicknesses to achieve the desired tranmissivity curve for color filter 500. Indeed, in some embodiments, the variable optical density of color filter 500 may not be achieved by bands of high and low optical density material and may instead be achieved in an analog manner, in which the optical density of color filter 500 changes continuously (e.g., without step-changes in optical density) throughout color filter 500.

Color filter 500 may be configured to filter any color of visible light. In some cases, color filter 500 may be a white filter, in which case the color filter 500 allows all colors of visible light to pass color filter 500. In that case, the variable optical density of the white color filter 500 would simply be light filter to control how much white light can pass through the white color filter 500. In other words, color filter 500 may operate as a gray scale filter, where the variable optical density of color filter 500 results in the color filter 500 allowing varying amounts of white light to pass through color filter 500. In this manner, color filter 500 may be implemented as a monochrome filter, in which the filter is implemented from a clear material includes bands of black (or at least partially black) material configured to block varying amounts of all visible (i.e., white) light.

Color filter 500, for example, may be incorporated above each all sub-pixels within a particular pixel of a display device. Alternatively, color filter 500 (or similarly-configured color filters) may be incorporated above only a subset of sub-pixels within a particular pixel. Color filter 500 may be utilized within pixels having any number of sub-pixels.

As depicted in FIGS. 5A and 5B, the optical density of color filter 500 generally decreases moving from left to right. This is illustrated the corresponding graph, which depicts the sum of the tranmissivity of color filter 500 over the length of color filter 500. By adjusting the dimensions of the different high and low optical density material segments of color filter 500 a desired transmissivity curve can be achieved. Note that in the depicted example, the curve is an approximation of the transmissivity curve of color filter 500. The transmissivity of color filter 500 is generally determined by the corresponding widths of the high and low optical density material segments.

As depicted in FIGS. 5A and 5B, color filter 500 is arranged in a number of segments 502, with each segment 502 potentially including a region of low optical density material 504 and a region of high optical density material 506. Within each segment 502, the region of low optical density 504 has a width x and increases compared to the region of high optical density 506. The region of low optical density material 504 and a region of high optical density material 506 may be formed within the structure of color filter 500 (e.g., by changing a chemical make-up of color filter 500, for example by injecting dyes or pigment into color filter 500), or may be made up of a layer of patterned material mounted to a substrate formed of color filtering material.

In this arrangement, the transmissivity of color filter 500 over the length of color filter 500 can be calculated by integrating the transmissivity of the low optical density 504 segments over the length of color filter 500. This is illustrated by Equation (1), below:

$$T_{avg}(x) = \frac{1}{x}\int_0^x T(x)\,dx \qquad \text{Equation (1)}$$

The horizontal axis of FIG. 5A also depicts how color filter 500 is to be oriented when installed over a pixel in a display device. Specifically, the far left edge of color filter (the portion of color filter 500 having the highest optical density) is to be located over the region of the pixel's reflective surface that is exposed when the oil first begins moving from the oil's resting position (e.g., location 192 on FIG. 6). In this configuration, the higher optical density region of color filter 500 offsets or reduces the relatively rapid increase in reflectivity when the pixel's oil first moves from the oil's resting position.

Similarly, the far right edge of color filter (the portion of color filter 500 having the lowest optical density) is to be located over the region of the pixel's reflective surface that is exposed when the oil reaches the oil's fully open position (e.g., location 194 on FIG. 1B). In this configuration, the lower optical density region of color filter 500 offsets or reduces the relatively slow increase in reflectivity when the pixel's oil first moves into the oil accumulation region of the pixel.

Figure 6:
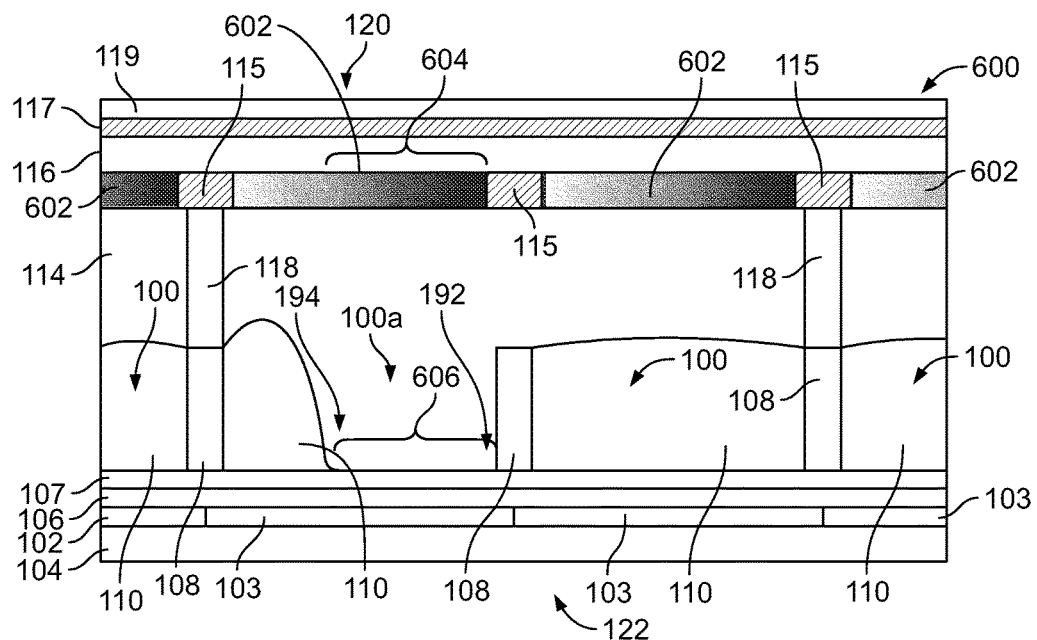
FIG. 6 illustrates a cross-sectional view of a portion of an electrowetting display device incorporating color filters having non-uniform optical density.

To illustrate, FIG. 6 depicts display device 600 of FIGS. 1A and 1B with color filters 602 replacing color filters 113.

Each color filter 602 may be configured to filter a particular color of visible light or may be white light filter, in which case the filter allows all visible light to propagate through the filter, while reducing the amount of light propagate in areas of high optical density, as described herein. As in the case of color filter 500, color filters 602 have a variable optical density (illustrated by the varying shading of color filters 602).

In this configuration, the amount of light that is ultimately reflected out of the pixel 100a (and, therefore, the perceived brightness of pixel 100a) is determined by at least two factors. The first factor is the reflectivity of the area of the reflective layer at the bottom of the pixel 100a that has been exposed due to oil movement. (See, for example, region 606 at the bottom of pixel 100a in FIG. 6). The second factor is the optical density of region 604 of color filter 602 above region 606. The reflectivity of the area of the reflective layer of pixel 100a varies based upon the location of the oil within pixel 100a. As the oil 110 moves further and further from the resting position of oil 110, increasing the area of region 606 in pixel 100a, the reflectivity of the pixel 100 increases. However, that increase will be offset by the optical density of color filter 602 overlaying region 606, which prevent some amount of light from entering pixel 100a or being reflected out of pixel 100a. The overall brightness response for pixel 100a—the amount of visible light reflected out of pixel 100a through color filter 602—based on a particular driving voltage is, therefore, the sum of the reflectivity of the pixel 100a, which is determined by the area of region 606 of the exposed reflective layer, and the tranmissivity of the region 604 of the color filter 602 overlaying region 606.

In a configuration of device 600 in which color filters 602 are positioned at the bottom of pixels 100 rather than over pixels 100, color filters 602 may be positioned on top of or integrated into electrode layer 102 of pixels 100.

Figure 7A:
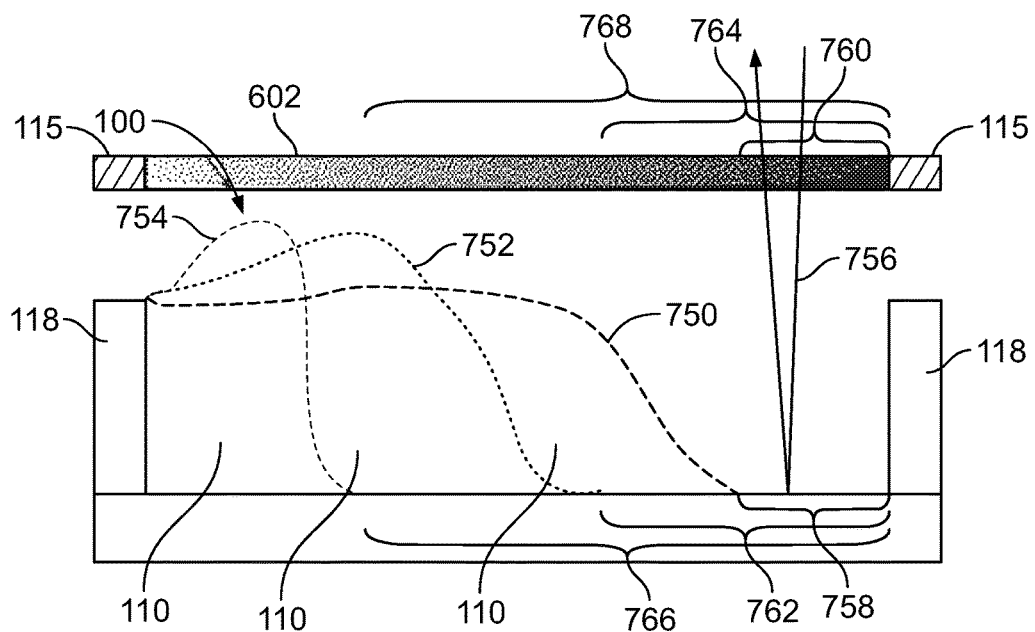
FIG. 7A depicts a simplified version of a pixel demonstrating how the optical density of the color filter positioned over a pixel combines with the reflectance area of the pixel to control an amount of light reflected out of pixel and through the color filter.

FIG. 7A depicts a simplified version of pixel 100 demonstrating how the optical density of color filter 602 positioned over pixel 100 combines with the reflectance area of pixel 100 to control an amount of light reflected out of pixel 100 and through color filter 602. FIG. 7A depicts pixel 100 being subjected to three different example driving voltages, resulting in corresponding movement of oil 110. The dashed lines 750, 752, and 754 show three oil 110 positions in response to the three example driving voltages.

In response to the first driving voltage, oil 110 has been displaced (illustrated by dashed line 750) exposing area 758 of the reflective layer at the bottom of pixel 100. Light rays (e.g., including 756) entering pixel 100 pass through region 760 of color filter 602 both when first entering pixel 100 and after being reflected from the reflective surface of pixel 100. Accordingly, at the driving voltage associated with the oil position depicted by line 750, the overall reflectivity (or perceived brightness) of pixel 100 is determined by the sum of the reflectivity of area 758 of the reflective layer and the transmissivity of region 760 of color filter 602.

In response to the second driving voltage, oil 110 has been displaced (illustrated by dashed line 752) exposing area 762 of the reflective layer at the bottom of pixel 100. Light ray 756 entering pixel 100 passes through region 764 of color filter 602 both when first entering pixel 100 and after being reflected from the reflective surface of pixel 100. Accordingly, at the driving voltage associated with the oil position depicted by line 752, the overall reflectivity (or perceived brightness) of pixel 100 is determined by the sum of the reflectivity of area 762 of the reflective layer and the transmissivity of region 764 of color filter 602.

In response to the third driving voltage, oil 110 has been displaced (illustrated by dashed line 754) exposing area 766 of the reflective layer at the bottom of pixel 100. Light ray 756 entering pixel 100 passes through region 768 of color filter 602 both when first entering pixel 100 and after being reflected from the reflective surface of pixel 100. Accordingly, at the driving voltage associated with the oil position depicted by line 754, the overall reflectivity (or perceived brightness) of pixel 100 is determined by the sum of the reflectivity of area 766 of the reflective layer and the transmissivity of region 768 of color filter 602.

Figure 7B:
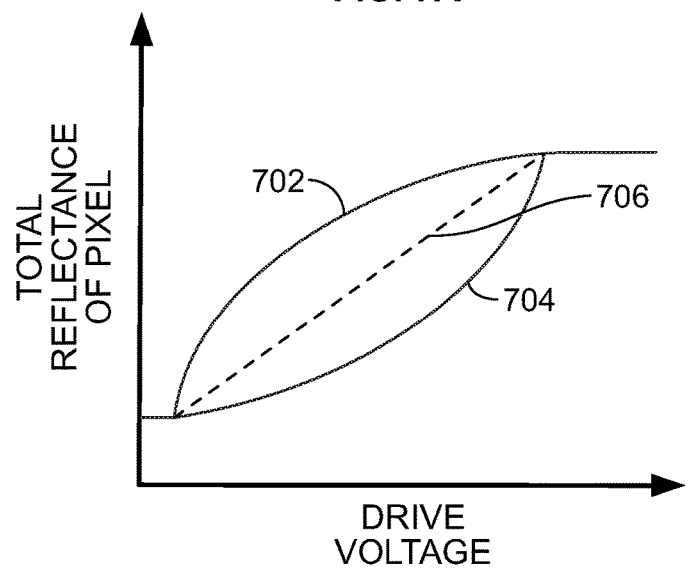
FIG. 7B is a chart illustrating the overall reflectivity (or perceived brightness) of a pixel in combination with a color filter having non-uniform optical density.

FIG. 7B is a chart illustrating the overall reflectivity (or perceived brightness) of pixel 100a in combination with a variable optical density color filter (e.g., color filter 500 of FIGS. 5A and 5B or color filter 602 of FIG. 6). In the chart, the horizontal axis represents driving voltage, while the vertical axis represents the total reflectance of pixel 100a in combination with the color filter. The chart depicts a first curve 702, which shows the reflectivity of pixel 100a ignoring the effects of the color filter. As described above with respect to FIG. 4, the reflectivity changes non-linearly with driving voltage. Curve 702 is, therefore, similar to the curve illustrated in FIG. 4 and described above.

A second curve 704 depicts the transmissivity of the variable optical density color filter versus driving voltage. Although the actual transmissivity of the color filter does not change as driving voltage changes (the transmissivity is fixed by the chemical composition or physical structure of color filter 500), the driving voltage determines the area of exposed region 606 of the reflective layer in pixel 100a and, therefore, the area of the color filter overlaying region 606 (e.g., region 604 of color filter 500). Curve 704, therefore, represents the transmissivity of the region of the color filter overlaying the region of the reflective layer of pixel 100a that is exposed at a particular driving voltage.

The actual reflectivity of pixel 100a in combination with color filter 500, therefore, will be the sum of curve 702, representing reflectivity of pixel 100a with no color filter based on driving voltage, and curve 704 representing the transmissivity of the color filter overlaying pixel 100a based on driving voltage. Curve 706 depicts the sum of curves 702 and 704 and, therefore, depicts the reflectivity of pixel 100a in combination with the color filter 500 versus driving voltage. As shown, by constructing the color filter to have a particular transmissivity curve (as illustrated in FIG. 5), the non-linear reflectivity of the pixel based on driving voltage depicted in FIG. 4 can be modulated. The resulting reflectivity curve 706 of FIG. 7B, being more linear (in some embodiments, the resulting curve may match the gamma curve of the display device), allows for more easily-controlled reflectivity based on driving voltage, enabling greater grayscale control for pixel 100a, as described herein.

In different embodiments, different color filters 500 having different transmissivity curves could be manufactured and incorporated into device 600 to adjust the reflectivity response of the pixels 100 in device 600. In FIG. 7B, it is apparent that the color filter 500 incorporated into device 600 has been configured to that pixel 100a in combination with color filter 500 has a linear reflectivity response. Different color filter 500 implementations may call for pixel 100a in combination with color filter 602 to have a non-linear reflectivity response to driving voltage, but where the curvature of the reflectivity response with no such filter (e.g., see FIG. 4) is modulated so that the reflectivity response with the present color filter 602 is more linear (e.g., matching a desired gamma curve for the display device) than without the color filter 602. For example, it may be desirable that the curvature of the reflectivity response have a shallow curve with a smaller slope at lower driving voltages than at higher driving voltages.

Because the reflectivity response in the present pixel design can be made more linear, thereby improving grayscale control within device 600, the present design may remove, or otherwise reduce, the need for white pixels to be incorporated into device 600. In conventional display devices, because of the poor reflectivity control based on driving voltage (see, for example, FIG. 4), the conventional display devices incorporate white pixels to improve grayscale control. Specifically, because perceived brightness (i.e., reflectivity) can be difficult to control for a particular pixel (e.g., a red pixel), the brightness of a second, while pixel, is also adjusted to provide more fine-tuned grayscale control. In the present design, because the pixel incorporating the present color filter may have an improved grayscale response (i.e., reflectivity versus driving voltage control), the need to incorporate white pixels into conventional devices may be reduced.

Additionally, in the present color filter design, the transmissivity curve of the color filter can be configured to allow more white light to pass through the color filter at higher driving voltages. This may cause the overall brightness over the pixel in combination with such a color filter to increase, reducing the overall need for an additional white pixel to be incorporated into the display to provide added brightness.

Figure 8:
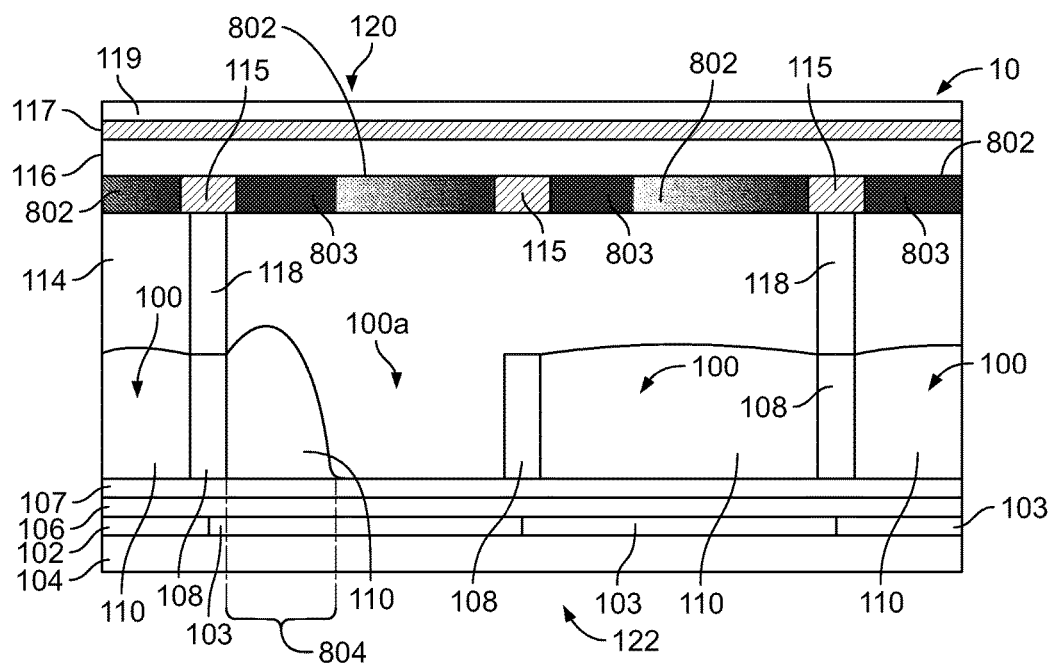
FIG. 8 illustrates a cross-sectional view of a portion of a second embodiment of an electrowetting display device incorporating color filters having non-uniform optical density.

In some embodiments, the present variable optical density color filter may be configured to include an area of maximum optical density 803 (e.g., blocking all visible light) directly over the region 804 of the pixel 100 in which the oil accumulates when the pixel is fully open. FIG. 8 depicts electrowetting display 800 including such a color filter 802. In this arrangement, light that may otherwise enter pixel 100 and interact with oil 110 (and potentially be reflected back out from pixel 100) would be absorbed. In some cases, this can protect the oil 110 within each pixel 100, as the interaction of light with oil 110 can sometimes breakdown or otherwise damage oil 110. Alternatively, this arrangement can be implemented by extending black matrix material 115 either into or over a portion of each color filter 802.

In the present disclosure, the varying optical density of the various color filters incorporated into the present display device can be achieved using any suitable approach. Within a particular color filter, the optical density could vary continuously throughout the length of the color filter—i.e., in an apparently analog manner. For example, FIG. 9A depicts a top view of an example color filter 902 in which the filter's optical density varies continuously along the length of color filter 902. In this approach, the varying optical density may be achieved by controlling an amount of color filtering material injected into or coated on a substantially transparent substrate material. In color filter 902 implementations that are constructed using a photoresist material including a color dye or pigment to cause the color filtering behavior, the distribution of the color dye or pigment within the color filter 902 could be adjusted to provide an optical density that varies along the length of the color filter in a continuous manner. Alternatively, where the color dye or pigment is distributed evenly throughout the photoresist material, the optical density of color filter 902 could be adjusted continuously (i.e., in an analog manner) along the length of color filter 902 by adjusting the thickness of the color filter along the length of color filter 902.

In an alternative approach, FIG. 9B depicts a top view of an example color filter 904 in which the filter's optical density does not vary continuously along the length of color filter 904. Instead, color filter 904 is made up of a number of bands of minimum optical density 906 and maximum optical density 908 that are arranged to approximate a continuous change in optical density along the length of color filter 904. The bands of minimum optical density 906 may be portions of color filter that are entirely transparent to the color of visible light associated with the color of color filter 904. The bands of maximum optical density 908 may be a black matrix (or other suitable) material configured to block all visible light or may represent portions of color filter 904 that are altered to increase their optical density. With reference to FIG. 9B, it is apparent that the overall optical density of color filter 904 increases along the length of color filter 904 moving from top to bottom. That is, with reference to FIG. 9B, a region at the top of color filter 904 encompassing a number of bands of maximum optical density 908 will allow more visible light to pass through than a similarly-sized region towards the bottom of color filter 904.

Color filter 904 may be fabricated using photolithographic techniques, for example, which enable the deposition or formation of materials either within or upon a surface of color filter 904. Here, color filter 904 may be fabricated by first providing a color filter configured to filter the desired color of visible light or white light, if desired. Then, using photolithographic techniques, the bands of maximum optical density 908 can be patterned and formed either within the structure of color filter or over the surface of color filter 904. In FIG. 9B, the bands of maximum optical density 908 are made up of material all having the same optical density. The variable optical density across the length of color filter 904 is achieved by varying the width of each band of maximum optical density 908.

Figure 10:
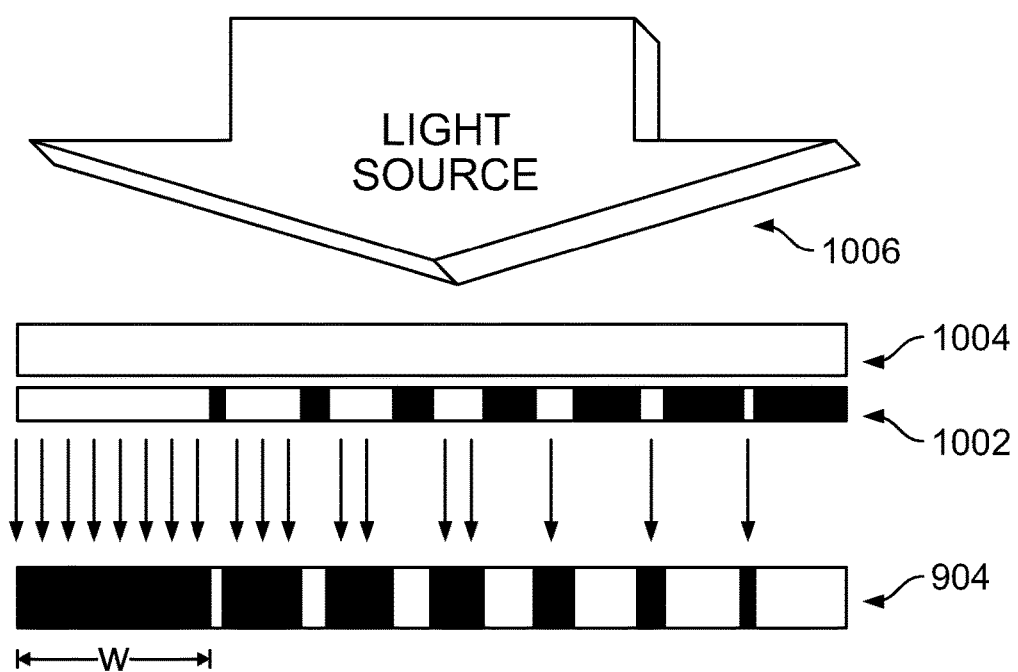
FIG. 10 depicts a fabrication process for forming the color filter of FIG. 9B.

FIG. 10 depicts such a fabrication process for forming color filter 904 of FIG. 9B. Color filter 904 is positioned below mask 1002, quartz substrate 1004 and light source 1006. In FIG. 10, color filter 904, mask 1002, and quartz substrate 1004 are each shown in cross-sectional views.

Mask 1002 may be a diffractive mask includes a pattern of light and dark bands, as illustrated, and can be considered a half-tone mask. The light bands in mask 1002 are generally transparent to light emitted by light source 1006, while the dark bands block or absorb light emitted by light source 1006. In the depicted embodiment, the light and dark bands of mask 1002 are built up upon or embedded into quartz substrate 1004. Quartz substrate 1004 is generally transparent to light emitted by light source 1006. When using quartz substrate 1004, mask 1002 may be formed of an etched chromium material, in which the dark bands in mask 1002 are formed from chromium material mounted to quartz substrate 1004, while the light bands in mask 1002 correspond to regions of the chromium material that have been etched away.

During fabrication, light source 1006 emits light towards mask 1002 and color filter 904. The light from light source 1006 passes through the light bands of mask 1002 striking the surface of color filter 904.

In this example color filter 904 includes a first layer of color filtering material 903. First layer of color filter material 903 may include a layer of conventional color filter material (e.g., a photoresist material including a suitable dye or pigment) configured to filter visible light of a particular color or range of wavelengths. Color filter 904 also includes a layer of light-absorbing or blocking photoresist layer 905 that includes a black dye or pigment, such as carbon particles.

The portions of photoresist layer 905 that are struck with light from light source 1006 solidify and become the high optical density regions of color filter 904. The portions of photoresist layer 905 that are not struck with light from light source 1006 (because the light is blocked by the dark bands of mask 1002) do not solidify and are removed following etching or placement of color filter 904 into a solvent bath. Those regions, once removed, form openings in the photoresist layer 905 that become the low optical density regions of color filter 904. The use of photoresist layer 905 to set forth the regions of high optical density in color filter 904 may enable the patterning of sub-micron features within the regions of high optical density.

Color filter 904 (depicted in FIGS. 9B and 10) is generally made up of regions or bands of minimum and maximum optical density. Although the configuration of the bands (specifically, their relative thicknesses w—see FIG. 10) can be adjusted to achieve, or at least approximate, a desired transmissivity curve over the length of color filter 904, further control over the transmissivity curve may be achieved by using pixelated bands of minimum and maximum optical density materials. Such an approach may provide improved control of the transmissivity curve of color filter 904 by providing a number of different grayscale levels for each of the bands of non-minimum optical density.

For example, the dark bands of mask 1002, rather than be continuous band of light-blocking material, may instead be broken up into a large number of small regions (sometimes referred to as pixels), where only a subset of those regions include light-blocking material. In this manner, different grayscale levels may be achieved for one or more different pixilated bands of dark material in mask 1002. Then, using mask 1002 a color filter can be fabricated (see, for example, the process illustrated by FIG. 10) with improved control over the transmissivity curve of the color filter.

For example, FIGS. 11A, 11B, and 11C depict approaches for pixelating the bands of mask 1002. Bands 1102, 1104, and 1106 each have the same thickness, but by controlling the relatively density of the small regions of dark material versus regions of light material, a number of different grayscale levels can be achieved. Band 1102 represents a ⅓ grayscale level, band 1104 a ¼ grayscale level, and band 1106 a ⅕ grayscale level. The various pixelated bands may be arranged in any suitable pattern. For example, the light and dark regions could be distributed randomly within each band. Alternatively, a specific algorithm for distributing the light and dark regions within each band, such as a Floyd-Steinberg dithering algorithm, may be used to construct each band. The Floyd-Steinberg dithering algorithm may be used to distribute the light and dark regions within each band. The approach relies upon error diffusion to accurately achieve a desired grayscale level. To illustrate, FIGS. 12A, 12B and 12C depict approaches for pixelating the bands of mask 1002 using a Floyd-Steinberg dithering algorithm. In this example, band 1102 represents a ⅓ grayscale level, band 1104 a ¼ grayscale level, and band 1106 a ⅕ grayscale level.

Figure 13:
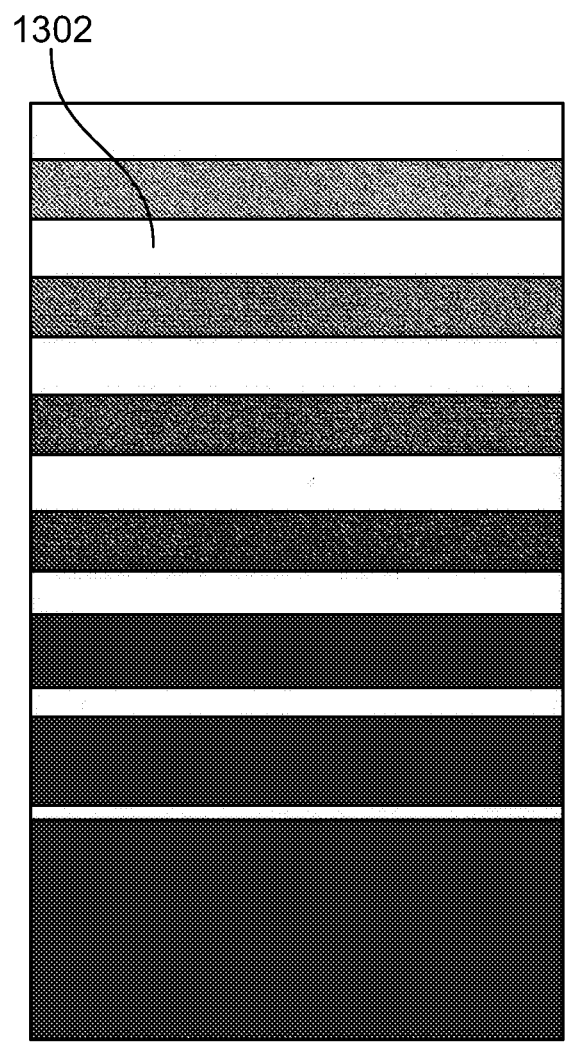
FIG. 13 depicts a top view of a color filter that has been generated using a grayscale mask.

To illustrate, FIG. 13 depicts a top view of color filter 1302 that has been generated using a grayscale mask (e.g., mask 1002 of FIG. 10) including a number of different bands of varying optical density. Such an approach allows the optical density of color filter 1302 to vary more smoothly across the surface of color filter 1302.

Figure 14:
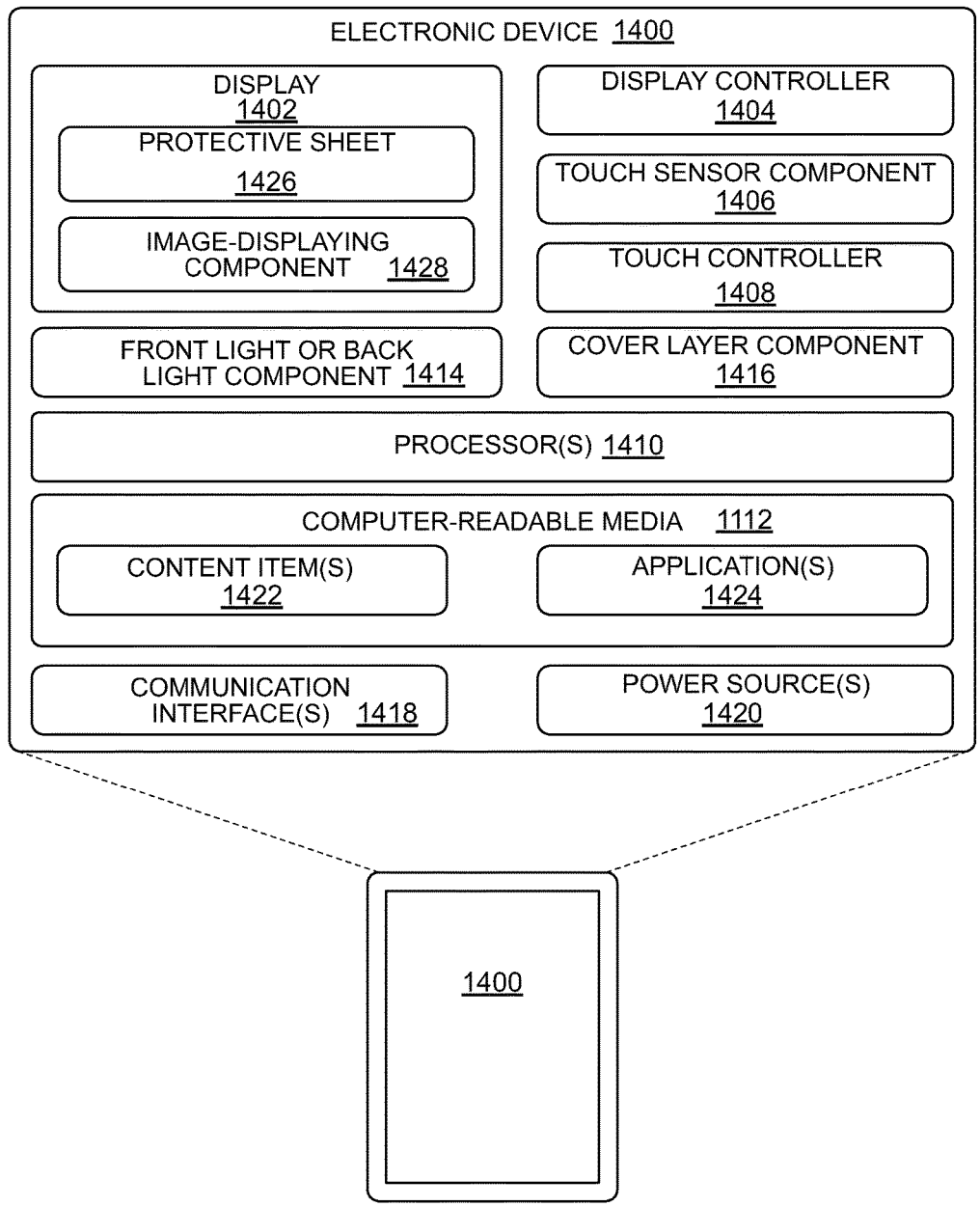
FIG. 14 illustrates an example electronic device that may incorporate a display device, according to various embodiments.

FIG. 14 illustrates an example electronic device 1400 that may incorporate any of the display devices discussed above. Electronic device 1400 may comprise any type of electronic device having a display. For instance, electronic device 1400 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1400 may be a non-mobile electronic device (e.g., a computer display or a television). In addition, while FIG. 14 illustrates several example components of electronic device 1400, it is to be appreciated that electronic device 1400 may also include other conventional components, such as an operating system, system busses, input/output components, and the like. Further, in other embodiments, such as in the case of a television or computer monitor, electronic device 1400 may only include a subset of the components illustrated.

Regardless of the specific implementation of electronic device 1400, electronic device 1400 includes a display 1402 and a corresponding display controller 1404. The display 1402 may represent a reflective or transmissive display in some instances or, alternatively, a transflective display (partially transmissive and partially reflective).

In one embodiment, display 1402 comprises an electrowetting display that employs an applied voltage to change the surface tension of a fluid in relation to a surface. For example, such an electrowetting display may include an array of pixels as described herein, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of the display are independently activated, display 1402 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "white" value of the pixel may correspond to a brightest red of the color filter. Furthermore, while some examples herein are described in the environment of a reflective display, in other examples, display 1402 may represent a backlit display, examples of which are mentioned above.

In addition to including display 1402, FIG. 14 illustrates that some examples of electronic device 1400 may include a touch sensor component 1406 and a touch controller 1408. In some instances, at least one touch sensor component 1406 resides with, or is stacked on, display 1402 to form a touch-sensitive display. Thus, display 1402 may be capable of both accepting user touch input and rendering content in response to or corresponding to the touch input. As several examples, touch sensor component 1406 may comprise a capacitive touch sensor, a force sensitive resistance (FSR), an interpolating force sensitive resistance (IFSR) sensor, or any other type of touch sensor. In some instances, touch sensor component 1406 is capable of detecting touches as well as determining an amount of pressure or force of these touches.

FIG. 14 further illustrates that electronic device 1400 may include one or more processors 1410 and one or more computer-readable media 1412, as well as a front light component 1414 (which may alternatively be a backlight component in the case of a backlit display) for lighting display 1402, a cover layer component 1416, such as a cover glass or cover sheet, one or more communication interfaces 1418 and one or more power sources 1420. The communication interfaces 1418 may support both wired and wireless connection to various networks, such as cellular networks, radio, WiFi networks, short range networks (e.g., Bluetooth® technology), and infrared (IR) networks, for example.

Depending on the configuration of electronic device 1400, computer-readable media 1412 (and other computer-readable media described throughout) is an example of computer storage media and may include volatile and nonvolatile memory. Thus, computer-readable media 1412 may include, without limitation, RAM, ROM, EEPROM, flash memory, and/or other memory technology, and/or any other suitable medium that may be used to store computer-readable instructions, programs, applications, media items, and/or data which may be accessed by electronic device 1400.

Computer-readable media 1412 may be used to store any number of functional components that are executable on processor 1410, as well as content items 1422 and applications 1424. Thus, computer-readable media 1412 may include an operating system and a storage database to store one or more content items 1422, such as eBooks, audio books, songs, videos, still images, and the like. Computer-readable media 1412 of electronic device 1400 may also store one or more content presentation applications to render content items on electronic device 1400. These content presentation applications may be implemented as various applications 1424 depending upon content items 1422. For instance, the content presentation application may be an electronic book reader application for rending textual electronic books, an audio player for playing audio books or songs, or a video player for playing video.

In some instances, electronic device 1400 may couple to a cover (not illustrated in FIG. 14) to protect the display 1402 (and other components in the display stack or display assembly) of electronic device 1400. In one example, the cover may include a back flap that covers a back portion of electronic device 1400 and a front flap that covers display 1402 and the other components in the stack. Electronic device 1400 and/or the cover may include a sensor (e.g., a Hall effect sensor) to detect whether the cover is open (i.e., if the front flap is not atop display 1402 and other components). The sensor may send a signal to front light component 1414 if the cover is open and, in response, front light component 1414 may illuminate display 1402. If the cover is closed, meanwhile, front light component 1414 may receive a signal indicating that the cover has closed and, in response, front light component 1414 may turn off.

Furthermore, the amount of light emitted by front light component 1414 may vary. For instance, upon a user opening the cover, the light from the front light may gradually increase to its full illumination. In some instances, electronic device 1400 includes an ambient light sensor (not illustrated in FIG. 14) and the amount of illumination of front light component 1414 may be based at least in part on the amount of ambient light detected by the ambient light sensor. For example, front light component 1414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1402 may vary depending on whether front light component 1414 is on or off, or based on the amount of light provided by front light component 1414. For instance, electronic device 1400 may implement a larger default font or a greater contrast when the light is off compared to when the light is on. In some embodiments, electronic device 1400 maintains, if the light is on, a contrast ratio for display 1402 that is within a certain defined percentage of the contrast ratio if the light is off.

As described above, touch sensor component 1406 may comprise a capacitive touch sensor that resides atop display 1402. In some examples, touch sensor component 1406 may be formed on or integrated with cover layer component 1416. In other examples, touch sensor component 1406 may be a separate component in the stack of the display assembly. Front light component 1414 may reside atop or below touch sensor component 1406. In some instances, either touch sensor component 1406 or front light component 1414 is coupled to a top surface of a protective sheet 1426 of display 1402. As one example, front light component 1414 may include a lightguide sheet and a light source (not illustrated in FIG. 14). The lightguide sheet may comprise a substrate (e.g., a transparent thermoplastic such as PMMA or other acrylic), a layer of lacquer and multiple grating elements formed in the layer of lacquer that function to propagate light from the light source towards display 1402; thus, illuminating display 1402.

Cover layer component 1416 may include a transparent substrate or sheet having an outer layer that functions to reduce at least one of glare or reflection of ambient light incident on electronic device 1400. In some instances, cover layer component 1416 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3$h$ pencil). Without such scratch resistance, a device may be more easily scratched and a user may perceive the scratches from the light that is dispersed over the top of the reflective display. In some examples, protective sheet 1426 may include a similar UV-cured hard coating on the outer surface. Cover layer component 1416 may couple to another component or to protective sheet 1426 of display 1402. Cover layer component 1416 may, in some instances, also include a UV filter, a UV-absorbing dye, or the like, for protecting components lower in the stack from UV light incident on electronic device 1400. In still other examples, cover layer component 1416 may include a sheet of high-strength glass having an antiglare and/or antireflective coating.

Display 1402 includes protective sheet 1426 overlying an image-displaying component 1428. For example, display 1402 may be preassembled to have protective sheet 1426 as an outer surface on the upper or image-viewing side of display 1402. Accordingly, protective sheet 1426 may be integral with and may overlay image-displaying component 1428. Protective sheet 1426 may be optically transparent to enable a user to view, through protective sheet 1426, an image presented on image-displaying component 1428 of display 1402.

In some examples, protective sheet 1426 may be a transparent polymer film in the range of 25 to 200 micrometers in thickness. As several examples, protective sheet 1426 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1426 may include a coating, such as the hard coating described above. For instance, the hard coating may be applied to the outer surface of protective sheet 1426 before or after assembly of protective sheet 1426 with image-displaying component 1428 of display 1402. In some examples, the hard coating may include a photoinitiator or other reactive species in its composition, such as for curing the hard coating on protective sheet 1426. Furthermore, in some examples, protective sheet 1426 may be dyed with a UV-light-absorbing dye, or may be treated with other UV-absorbing treatment. For example, protective sheet 1426 may be treated to have a specified UV cutoff such that UV light below a cutoff or threshold wavelength is at least partially absorbed by protective sheet 1426, thereby protecting image-displaying component 1428 from UV light.

According to some embodiments herein, one or more of the components discussed above may be coupled to display 1402 using fluid optically-clear adhesive (LOCA). For example, the lightguide portion of front light component 1414 may be coupled to display 1402 by placing LOCA on the outer or upper surface of protective sheet 1426. If the LOCA reaches the corner(s) and/or at least a portion of the perimeter of protective sheet 1426, UV-curing may be performed on the LOCA at the corners and/or the portion of the perimeter. Thereafter, the remaining LOCA may be UV-cured and front light component 1414 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1414. In other embodiments, the LOCA may be placed near a center of protective sheet 1426, and pressed outwards towards a perimeter of the top surface of protective sheet 1426 by placing front light component 1414 on top of the LOCA. The LOCA may then be cured by directing UV light through front light component 1414. As discussed above, and as discussed additionally below, various techniques, such as surface treatment of the protective sheet, may be used to prevent discoloration of the LOCA and/or protective sheet 1426.

While FIG. 14 illustrates a few example components, electronic device 1400 may have additional features or functionality. For example, electronic device 1400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1400 may reside remotely from electronic device 1400 in some implementations. In these implementations, electronic device 1400 may utilize communication interfaces 1418 to communicate with and utilize this functionality.

In an embodiment, an electrowetting display device includes a first support plate and a second support plate, an oil between the first support plate and the second support plate, and an electrolyte fluid, immiscible with the oil disposed between the first support plate and the second support plate. The electrowetting display device includes a plurality of pixel walls over the first support plate. The plurality of pixel walls is associated with an electrowetting pixel. The electrowetting display device includes a pixel electrode over the first support plate for applying a voltage within the electrowetting pixel to cause relative displacement of the oil within the electrowetting pixel to modify a reflectance of the electrowetting pixel. The reflectance of the electrowetting pixel is non-linearly dependent on the voltage. The electrowetting display device includes a color filter over the electrowetting pixel. The color filter allows propagation of visible light of a first color and prevents propagation of visible light of a second color. The color filter includes a layer of light-absorbing photoresist that is patterned into a first plurality of regions and a second plurality of regions. Each region in the first plurality of regions has a first optical density and each region in the second plurality of regions has a second optical density so that the color filter has a non-uniform optical density.

In another embodiment, a display device includes a first support plate, and a wall over the first support plate. The wall is associated with an electrowetting pixel. The display device includes a filter over the electrowetting pixel configured to allow propagation of visible light having a first wavelength in a first continuous range of wavelengths and prevent propagation of visible light having a second wavelength outside the first continuous range of wavelengths. The filter has an optical density that is not uniform over a surface of the filter.

In another embodiment, a method for fabricating a color filter for a display device includes positioning a diffractive mask over the color filter. The diffractive mask has an optical density that is not uniform over a surface of the diffractive mask and the color filter is configured to allow propagation of visible light having a first wavelength in a first continuous range of wavelengths and prevent propagation of visible light having a second wavelength outside the first continuous range of wavelengths. The method includes illuminating the color filter through the diffractive mask to cause the color filter to have a non-uniform optical density.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
a first support plate and a second support plate;
an oil between the first support plate and the second support plate;
an electrolyte fluid, immiscible with the oil disposed between the first support plate and the second support plate;
a plurality of pixel walls over the first support plate, the plurality of pixel walls being associated with an electrowetting pixel;
a pixel electrode over the first support plate for applying a voltage within the electrowetting pixel to cause relative displacement of the oil within the electrowetting pixel to modify a reflectance of the electrowetting pixel, the reflectance of the electrowetting pixel being non-linearly dependent on the voltage; and
a color filter over the electrowetting pixel, the color filter allowing propagation of visible light of a first color and preventing propagation of visible light of a second color, the color filter including a layer of light-absorbing photoresist that is patterned into a first plurality of regions and a second plurality of regions, each region in the first plurality of regions having a first optical density and each region in the second plurality of regions having a second optical density so that the color filter has a non-uniform optical density.

2. The electrowetting display device of claim 1, wherein an application of the voltage within the electrowetting pixel causes displacement of the oil within the electrowetting pixel in a first direction towards a first pixel wall in the plurality of pixel walls and the non-uniform optical density of the color filter decreases along a surface of the color filter in a second direction parallel to the first direction towards the first pixel wall.

3. The electrowetting display device of claim 1, wherein, in response to the voltage being a maximum driving voltage, the oil accumulates within the electrowetting pixel against at least a portion of a first pixel wall in the plurality of pixel walls in an oil accumulation region and the layer of light-absorbing photoresist includes a region of maximum optical density over the oil accumulation region to prevent light from entering the oil when the oil is in the oil accumulation region.

4. A display device, comprising:
a first support plate;
a wall over the first support plate, the wall being associated with an electrowetting pixel; and
a filter over the electrowetting pixel, the filter being configured to allow propagation of visible light having a first wavelength in a first continuous range of wavelengths and prevent propagation of visible light having a second wavelength outside the first continuous range of wavelengths, the filter having an optical density that is not uniform over a surface of the filter.

5. The display device of claim 4, wherein the filter includes a first plurality of regions having a first optical density and a second plurality of regions having a second optical density.

6. The display device of claim 5, wherein the filter includes a layer of light-absorbing photoresist that is patterned to form the first plurality of regions having the first optical density and the second plurality of regions having the second optical density.

7. The display device of claim 6, wherein the layer of light-absorbing photoresist includes at least one of carbon particles and black pigment.

8. The display device of claim 6, wherein the first plurality of regions in the layer of light-absorbing photoresist includes a plurality of bands of light-absorbing photoresist extending across a width of the filter.

9. The display device of claim 5, wherein the first optical density is a maximum optical density of the filter and the second optical density is a minimum optical density of the filter.

10. The display device of claim 5, wherein the first plurality of regions having a first optical density allow propagation of at least 70% of visible light through the filter and the second plurality of regions having a second optical density prevent propagation of at least 70% of visible light through the filter.

11. The display device of claim 4, including:
a first fluid over the first support plate; and
a pixel electrode for applying a voltage within the electrowetting pixel to cause movement of the first fluid within the electrowetting pixel and modify a reflectance of the electrowetting pixel.

12. The display device of claim 11, wherein the optical density of the filter decreases along a surface of the filter in a direction towards the wall over the first support plate and an application of the voltage within the electrowetting pixel causes the first fluid to move towards the wall over the first support plate.

13. The display device of claim 11, wherein the electrowetting pixel includes an accumulation region for the first fluid and the filter includes a region of maximum optical density of the filter over the accumulation region to prevent light from entering the first fluid when the first fluid is in the accumulation region.

14. The display device of claim 11, wherein the reflectance of the electrowetting pixel changes non-linearly with respect to the voltage and the optical density that is not uniform over the surface of the filter is configured so that an amount of light reflected out of the electrowetting pixel through the filter changes linearly with respect to the voltage.

15. A display device, comprising:
a first support plate;
a pixel wall over the first support plate, the pixel wall being associated with an electrowetting pixel;
a pixel electrode over the first support plate;
a first fluid over the first support plate; and
a filter over the electrowetting pixel, the filter including a first region configured to allow a first color of visible light to pass through the filter, wherein an optical density of the first region of the filter decreases in a direction towards the pixel wall and setting the pixel electrode to a voltage causes the first fluid to move towards the pixel wall.

16. The display device of claim 15, wherein the filter includes a layer of light-absorbing photoresist that that includes at least one of carbon particles and black pigment, wherein the layer of light-absorbing photoresist is patterned to form the first region.

17. The display device of claim 15, wherein the electrowetting pixel includes an accumulation region for the first fluid and the filter includes a region of maximum optical density of the filter over the accumulation region.

18. The display device of claim 15, wherein a reflectance of the electrowetting pixel changes non-linearly with respect to the voltage and the optical density that is not uniform over the surface of the filter is configured so that an amount of light reflected out of the electrowetting pixel through the filter changes linearly with respect to the voltage.

19. The display device of claim 15, wherein the filter includes a second region configured to allow a second color of visible light to pass through the filter, the second region of the filter having an optical density that is not uniform and the first region is configured to prevent the second color of visible light from passing through the first region.

* * * * *